(12) United States Patent
Swift et al.

(10) Patent No.: US 11,558,471 B1
(45) Date of Patent: Jan. 17, 2023

(54) MULTIMEDIA CONTENT DIFFERENTIATION

(71) Applicant: INTERNATIONAL BUSINESS MACHINES CORPORATION, Armonk, NY (US)

(72) Inventors: Mary Diane Swift, Rochester, NY (US); Irene Lizeth Manotas Gutiérrez, White Plains, NY (US); Kelley Anders, East New Market, MD (US); Jonathan D. Dunne, Dungarvan (IE); Qi Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/705,621

(22) Filed: Mar. 28, 2022

(51) Int. Cl.
  *G06F 15/16* (2006.01)
  *H04L 67/147* (2022.01)
  *H04L 65/60* (2022.01)

(52) U.S. Cl.
  CPC .......... *H04L 67/147* (2013.01); *H04L 65/60* (2013.01)

(58) Field of Classification Search
  CPC .............................. H04L 67/147; H04L 65/60
  USPC .................................................. 709/203, 206
  See application file for complete search history.

(56) References Cited

U.S. PATENT DOCUMENTS

| | | | |
|---|---|---|---|
| 9,262,531 B2 | 2/2016 | Ferren et al. | |
| 9,270,714 B2 | 2/2016 | Herger et al. | |
| 10,685,074 B2 | 6/2020 | Deets, Jr. et al. | |
| 10,819,532 B1* | 10/2020 | van Rensburg | H04L 51/216 |
| 10,972,524 B1* | 4/2021 | Chambers | H04L 65/611 |
| 2018/0095940 A1 | 4/2018 | Meixner et al. | |
| 2020/0177404 A1* | 6/2020 | Silva | G06Q 10/109 |
| 2020/0279567 A1* | 9/2020 | Adlersberg | G06F 40/35 |
| 2020/0404377 A1 | 12/2020 | Wilkinson | |

FOREIGN PATENT DOCUMENTS

CN 108833260 A 11/2018

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Duyen M Doan
(74) *Attorney, Agent, or Firm* — Stosch Sabo

(57) ABSTRACT

A communication session between two or more computing devices is monitored. One or more share actions, that include one or more media documents, are identified in the communication session responsive to the media documents and based on the monitoring the communication session. Reaction data, that is related to the share actions, in the communication session is analyzed in response the share actions and based on the media documents. One or more relevant media documents are determined based on the analyzing the reaction data. The relevant media documents are analyzed based on the media documents. A first depiction rendered by a first of the devices of the communication session is modified based on the relevant media documents.

20 Claims, 7 Drawing Sheets

(56) References Cited

OTHER PUBLICATIONS

Jiang et al., "Chat with Illustration: A Chat System with Visual Aids," Research Gate, Proceedings of the 4th International Conference on Internet Multimedia Computing and Service, Sep. 2012, 3 pages (Abstract Only).

Lohmann et al., "Visual Analysis of Microblog Content Using Time-Varying Co-occurrence Highlighting in Tag Clouds," ACM, AVI '12: Proceedings of the International Working Conference on Advanced Visual Interfaces, May 2012, 4 pages, https://dl.acm.org/doi/10.1145/2254556.2254701.

* cited by examiner

MULTIMEDIA CONTENT DIFFERENTIATION

BACKGROUND

The present disclosure relates to processing multimedia content, and more specifically, to differentiation of content in a communication session.

Messaging applications may include software and applications that facilitate sharing text and multimedia. Users may share numerous messages and perform relatively high amounts of sharing in various communication sessions that are a part of a messaging application. It may be difficult to find or navigate through the various messaging applications.

SUMMARY

According to embodiments, disclosed are a method, system, and computer program product.

A communication session between two or more computing devices is monitored. One or more share actions in the communication session, that include one or more media documents, are identified. The identification is based on the monitoring the communication session. The identification of the one or more share actions is responsive to the one or more media documents. Reaction data in the communication session is analyzed. The reaction data is related to the share actions. The analysis is in response the share actions and based on the media documents. One or more relevant media documents are determined based on the analyzing the reaction data. The one or more relevant media documents are analyzed based on the one or more media documents. A first depiction of the communication session is modified. The modification is based on the one or more relevant media documents. The first depiction is rendered by a first computing device of the two or more computing devices.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
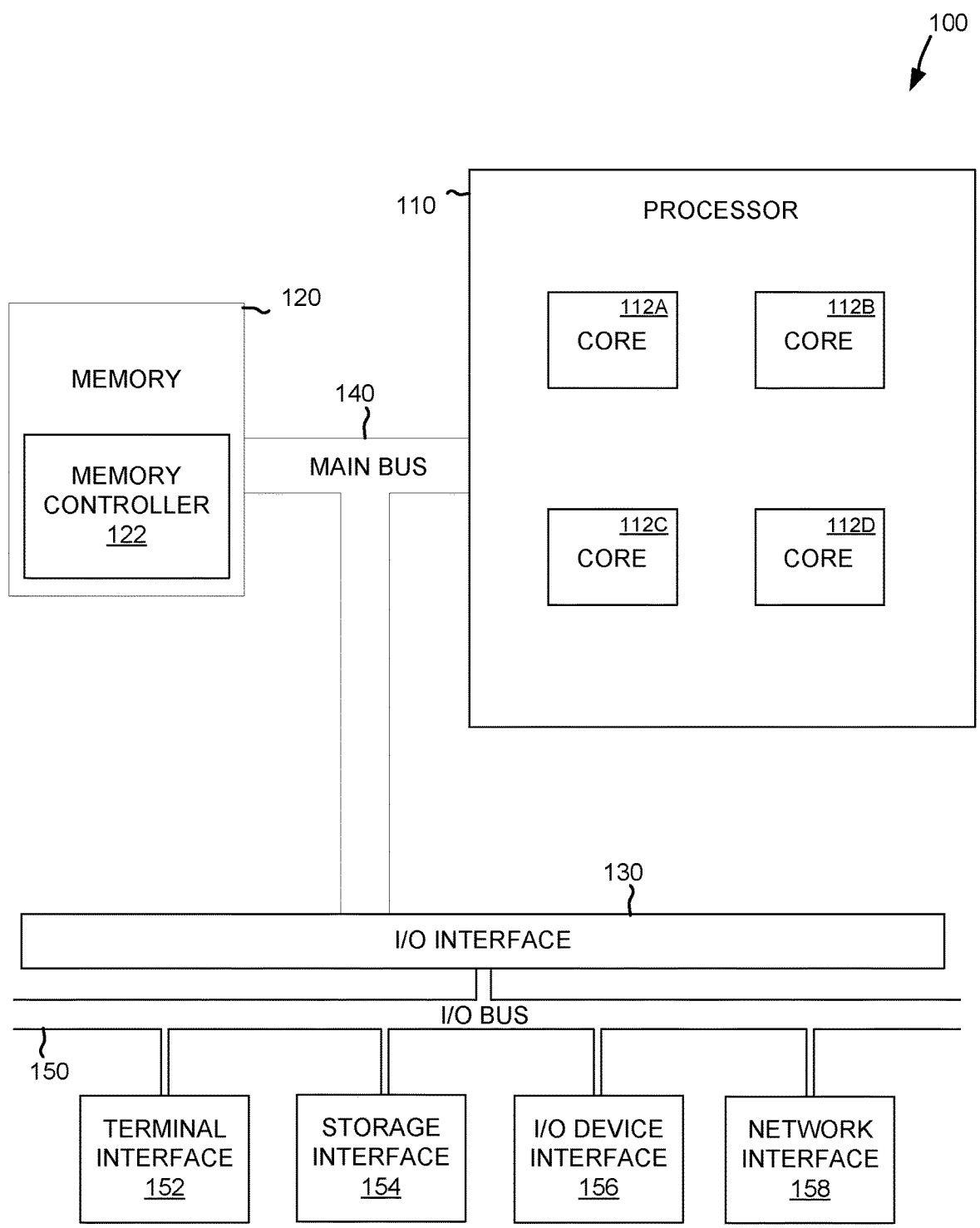
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to processing multimedia content; more particular aspects relate to differentiation of content in a communication session. While the present disclosure is not necessarily limited to such applications, various aspects of the disclosure may be appreciated through a discussion of various examples using this context.

Increasingly common to computing scenarios are the usage of messaging applications (e.g., chat apps). These chat apps provide the ability for users to send and receive messages, such as textual messages ("text messages") and multimedia messages ("media messages"). A textual message is a message that includes textual content, such as letters, words, phrases, sentences, paragraphs, and other relevant character-based language (e.g., textual characters that indicate emotion, emojis). A multimedia message is a message that includes content other than pure textual content, such as pictures, videos, waveforms, three-dimensional models, or other relevant media content.

With the increased popularity of messaging applications, there becomes an increase in the number of messages to which a user may become exposed. For instance, it is common that individual users can participate in multiple communication sessions at the same time. A communication session may be a series of one or more messages that are shared between two or more users. For instance, a communication session may be a direct message session in a chat app that is between two users. In another instance, a communication session may be a group chat in a chat app between many users. The users that participate (alternatively, "participant individuals") may perform share actions, such as sending various messages that are textual, multimedia, or both textual and multimedia in nature. It is a regular situation that many share actions are performed and many new messages are received from these communication sessions regularly. For instance, a group chat of business colleagues may share thousands of textual and multimedia messages in a given work week.

Due to the voluminous number of messages shared in chat apps, there may be drawbacks to usage of chat apps. One drawback is that users may become bogged down by chat apps. For instance, a user may become exposed to so many messages that they spend a significant amount of time during their workday trying to catch up and read through the amount of received messages. Another issue is that users may not see the right message at the right time. For instance, a user using a chat app may miss relevant and important messages unless they go through each newly received messages. This may become impractical or nearly impossible for a user to do, as some messages are related to particular times or events, and the user may not view the content of a message in enough time.

One attempt to fix this is through searching. For instance, a user may leverage a chat app to search, filter, or analyze text and audio messages. The user may leverage one or more operations to figure out the relevant and important messages with the support of text analysis and speech to text technologies. This may be limiting, however, because textual search does not always apply to modern messaging apps. Specifically, for the other multimedia content like pictures or videos, it is relatively difficult to analyze the visual content of pictures or videos and to figure out which piece of content could be relevant and important.

Some attempts to analyze the multimedia content may also be limiting. In detail, a first attempt to visually analyze content may be done through manual tagging and categorizing of information that is shared in communication sessions. This process of manual organization often lacks context or requires inorganic or tedious setup. Particularly, manual categorization of images may require administrative or other users to properly add tags to visual messages. These tags may not always be timely or accurate. A second attempt to visually analyze content may be done by an isolated image processing system. Such a processing system may falter because it does not include any information outside of the image. For instance, if a business group thread in a chat app regularly shares charts and graphs, image analysis may only provide generic categorization such as "chart" or "graph" that may become irrelevant to a user.

Some attempts to organize multimedia documents may include organization solutions that are performed by participants to the communication sessions, such as manually pinning of multimedia documents. For instance, today participants may pin the messages in the chat group when they need to ask the entire group a question or remind the entire group about an important multimedia document. In another instance, participants may pin messages they assume they may want to refer to later. There are a few drawbacks to the manual pinning. One is that the pinned items may not be differentiated per different user, group, or domain. For instance, a participant may want to see a certain set of media documents while other users may want to see a different set of pinned documents. Further, users may only be able to pin or save a few items before the system of pinning is cluttered or overwhelming. Additionally, pinning creates a requirement of users to recreate a document organization hierarchy.

Another attempt to organize multimedia documents performed by a participant, is to manually create tags for the documents. One drawback to manually tagging is that participants may not always know what the relevant tag for a media document is later. For instance, a user may tag a multimedia document when they initially see that document in the flow of a communication session. Later, the user may wish to call upon the same multimedia document because they are being asked about it or a related topic. If, however, the user does not recall the selected tags, they may not be able to quickly find the multimedia document.

While the various described techniques can be useful in limited scenarios, it may be insufficient due to the ever-increasing number of messages and share actions that occur in communication sessions. In all cases, the user may not be able to find multimedia documents in communication sessions without extensive searching and/or manual intervention.

Multimedia content differentiation ("MCD") may provide for more accurate and relevant surfacing and highlighting of media documents in chat apps. Specifically, MCD may operate to emphasize, highlight, summarize, or otherwise differentiate multimedia documents for an appropriate context in a given communication session. The MCD may be configured to monitor various communication sessions for sharing of messages, such as textual messages and multimedia messages ("share actions").

The MCD may be configured to identify, from a monitored communication session, share actions that are related to media documents. Specifically, the MCD may identify a share action, in response to that share action including one or more media documents. For example, a user may send a message that includes both textual elements and images to another user. In another example, a user may share a few videos in a group chat.

The MCD may be configured to analyze reaction data in a communication session. Specifically, in a communication where share actions occur, the MCD may analyze the textual messages favorites, saves, pins, and other relevant reaction data to a share action that includes media documents. The MCD may analyze reaction data based on a temporal component, such as analyzing textual messages that occur within a few seconds/minutes before or after a share action. The reaction data may be based on a relationship to the share action. For example, one or more replies may be directed to a share action that includes a media document, and the MCD may function by analyzing the replies that are directed to the share action.

The MCD may be configured to determine one or more relevant or important media documents in the communication session. Specifically, the MCD may utilize the analysis of the reaction data to determine one or more relevant media documents in the communication session. The determination may be based on a user profile of a user, such as profile information that is stored for each participant. The determination may be based on historical data, such as previous share actions, messages, and reaction data of a user.

The determination may be based on a particular participant. For example, the MCD may determine that three relevant media documents exist for a first participant from hundreds of media documents that are shared in a communication session between three participants. Continuing the example, the MCD may determine two relevant media documents for a second participant from the media documents that are shared in the communication session. Further continuing the example, the two relevant media documents may or may not be similar to the three previously determined relevant media documents.

The determination may be based on a group of participants in a communication session. For example, the MCD may determine that a first relevant media document exists for three of four participants in a communication session. In another example, the MCD may determine that three relevant media documents exist for all participants in a communication session.

The MCD may modify a communication session based on the relevant media documents. Specifically, the MCD may modify a depiction, render, or other appropriate presentation of a communication session inside of a messaging application. The modification may be to present, highlight, add flourishes to, or otherwise differentiate the media documents in a relevant manner. The modification may be performed automatically, e.g., the MCD may modify a first depiction of a communication session for a first user without the user requesting the modification. The MCD may modify the depiction without receiving any input from the user, such as receiving no input from an input device. The modification may be performed at a particular time, such as based on a time that is related to the relevant media documents. The modification may be performed responsive to a particular event, such as based on a calendar event or meeting event.

The modification may be performed based on subsequent share actions. For example, the MCD may continue to monitor a communication session between three participants. The MCD may identify subsequent textual or media documents that are related to relevant media documents. Responsive to the subsequent identification, the MCD may present to the user the relevant media documents.

Consequently, the MCD may operate by providing advantages over other approaches to creation, consumption, and sharing of multimedia content and media documents. Specifically, the MCD may identify relevant media documents and update or modify the display even without textual or audible shared media documents (e.g., videos, images). The MCD may perform the modification without purposeful input from a user. In detail, the MCD may perform modification and updates to the communication session to differentiate relevant documents, solely based on a natural or incidental action of a participant. The natural or incidental actions may include visual reactions to media documents, natural conversation, or mentions that are not specifically directed to or responsive to media documents.

The operation of the MCD may also provide benefits to a single person as they use a communication session. Specifically, the MCD may modify a communication session of a user based on past documents shared by that user. For example, a participant may share an image that includes relevant marketing materials with a group of team members. When a calendar entry indicates that a meeting relevant to the marketing materials is in the next week/day/hour, the MCD may surface to the same meeting participant the shared image. Surfacing may include uncovering, bringing focus to, or otherwise displaying or notifying a media document.

In some embodiments, the system, computer program product, and method described herein may use an artificial intelligence. "Artificial Intelligence" (AI) may be one example of cognitive systems that relate to the field of computer science directed at problem solving computers and computer behavior as related to humans and man-made and natural systems. Cognitive computing may utilize self-teaching algorithms that use, for example, and without limitation, data analysis, visual recognition, behavioral monitoring, and natural language processing to solve problems. As the subject matter data is received, organized, and stored, the data analysis and behavioral monitoring features of AI may analyze the data and behaviors to determine the relevant details through computational analytical tools which allow the associated systems to learn and analyze data, within the context of the present disclosure. With such an understanding, the AI may surface concepts and categories, and apply the acquired knowledge to teach (alternatively, train) the AI the relevant portions of the received data and behaviors. In addition to human behaviors and data, the AI may also be taught to analyze data and behaviors of man-made and natural systems (e.g., particle movement, energy reactions, complex interactions between individuals).

In addition, cognitive systems such as AI, based on information, may make decisions, which maximizes the chance of success in a given topic. More specifically, AI may learn from a dataset, including behavioral data, to solve problems and provide relevant recommendations. For example, in the field of artificial intelligent computer systems, machine learning (ML) systems process large volumes of data (seemingly related or unrelated) where the ML systems may be trained with data derived from a database or corpus of knowledge, as well as recorded behavioral data. The ML systems may look for, and determine, patterns (or lack of patterns), in the data, "learn" from the patterns in the data, and ultimately accomplish tasks without being given specific instructions. In addition, the ML systems—utilizing algorithms, represented as machine processable models—may learn from the data and create insights, foresights, and predictions based on this data. More specifically, ML may include the application of AI, such as, and without limitation, through creation of neural networks that can demonstrate learning behavior by performing tasks that are not explicitly programmed.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. Supervised learning includes determining a difference between generated predictions of the classification labels and the actual labels, and then minimizing that difference. If the thing is a number, the training process is called regression. Accordingly, supervised learning specializes in predicting the future.

A second learning style is unsupervised learning, where commonalities and patterns in the input data are determined by the ML system with little to no assistance by humans. Most unsupervised learning focuses on clustering, i.e., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labeled data. Semi-supervised classification methods are particularly relevant to scenarios where labeled data is scarce. In those cases, it may be difficult to construct a reliable classifier through either supervised or unsupervised training. This situation occurs in application domains where labeled data is expensive or difficult obtain, like computer-aided diagnosis, drug discovery, and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

A third learning style is reinforcement learning, where positive behavior is "rewarded" and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to respond most appropriately to certain stimuli or environments.

Accordingly, over time, this behavior reinforcement facilitates determining the optimal behavior for a particular environment or situation.

Neural networks are types of ML models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from neurons of a first layer to neurons in the next layer. At a basic level, each layer of the neural network includes one or more operators or functions operatively coupled to output and input. Output from the operator(s) or function(s) of the last hidden layer is referred to herein as activations. Eventually, a result is delivered from the output layers.

Deep learning may include a method of machine learning that incorporates neural networks in successive layers to learn from data in an iterative manner. Specifically, deep learning may include a type of neural-network ML in which systems can accomplish complex tasks by using multiple layers of choices based on output of a previous layer, creating increasingly smarter and more abstract conclusions. Deep learning complex neural networks are designed so that computers can be trained to support poorly defined abstractions and problems. Deep learning may be used to predict an output given a set of inputs, and either supervised learning or unsupervised learning can be used to facilitate such results.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
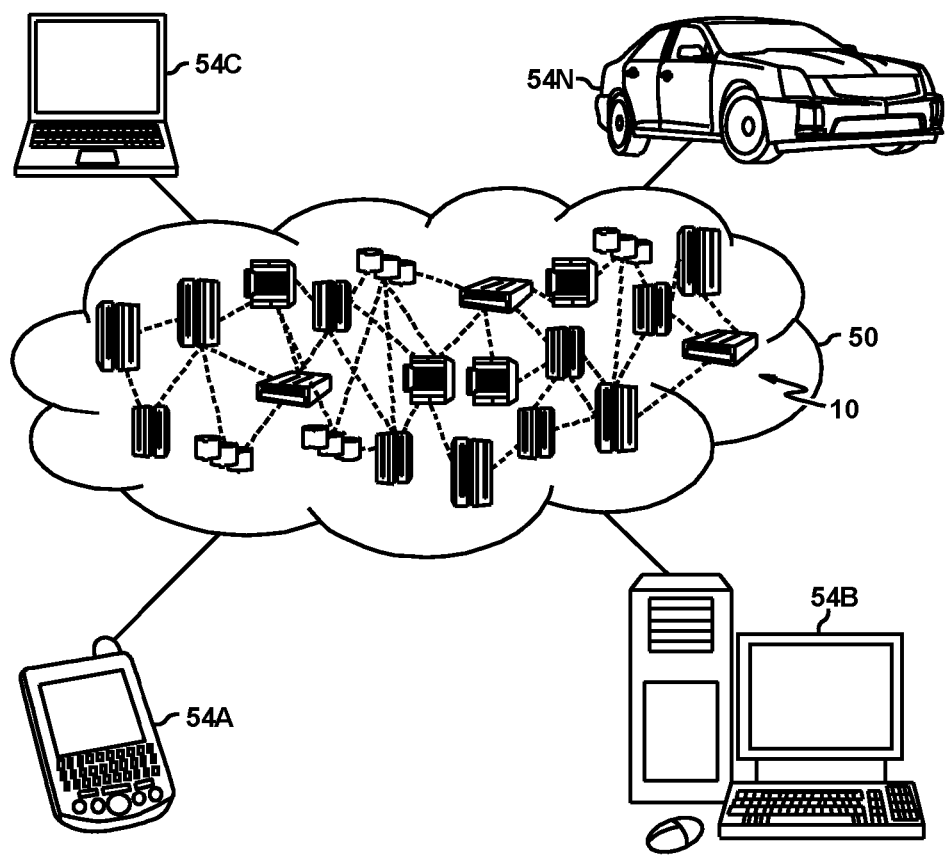
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
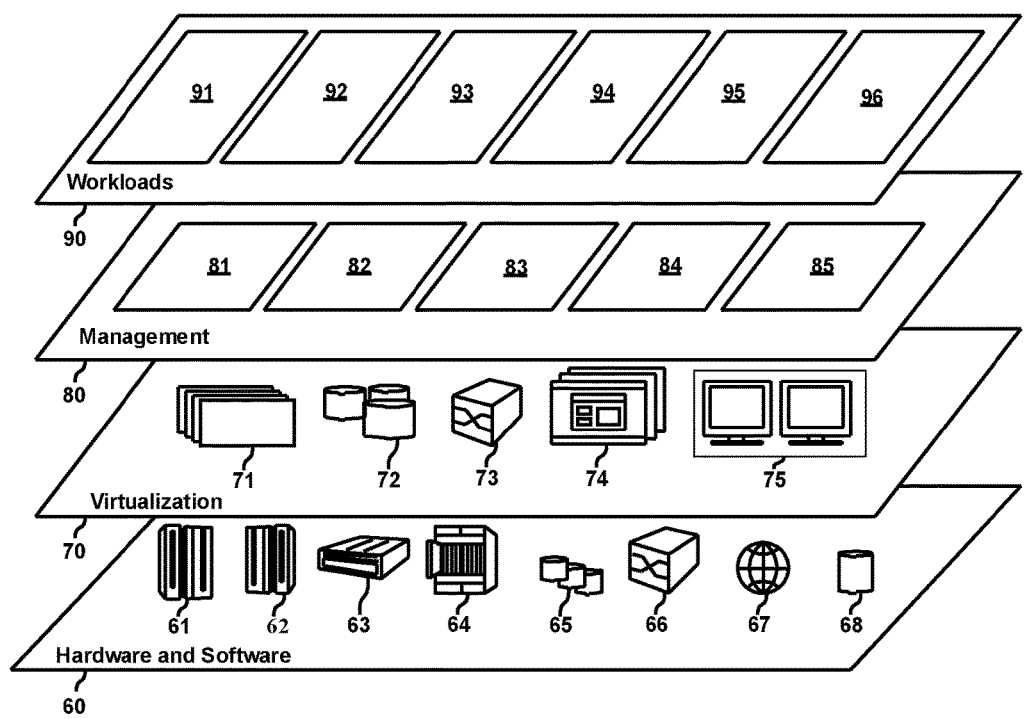
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 63; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 73; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 83 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 93; virtual classroom education delivery 93; data analytics processing 94; transaction processing 95; and MCD 96.

Figure 4:
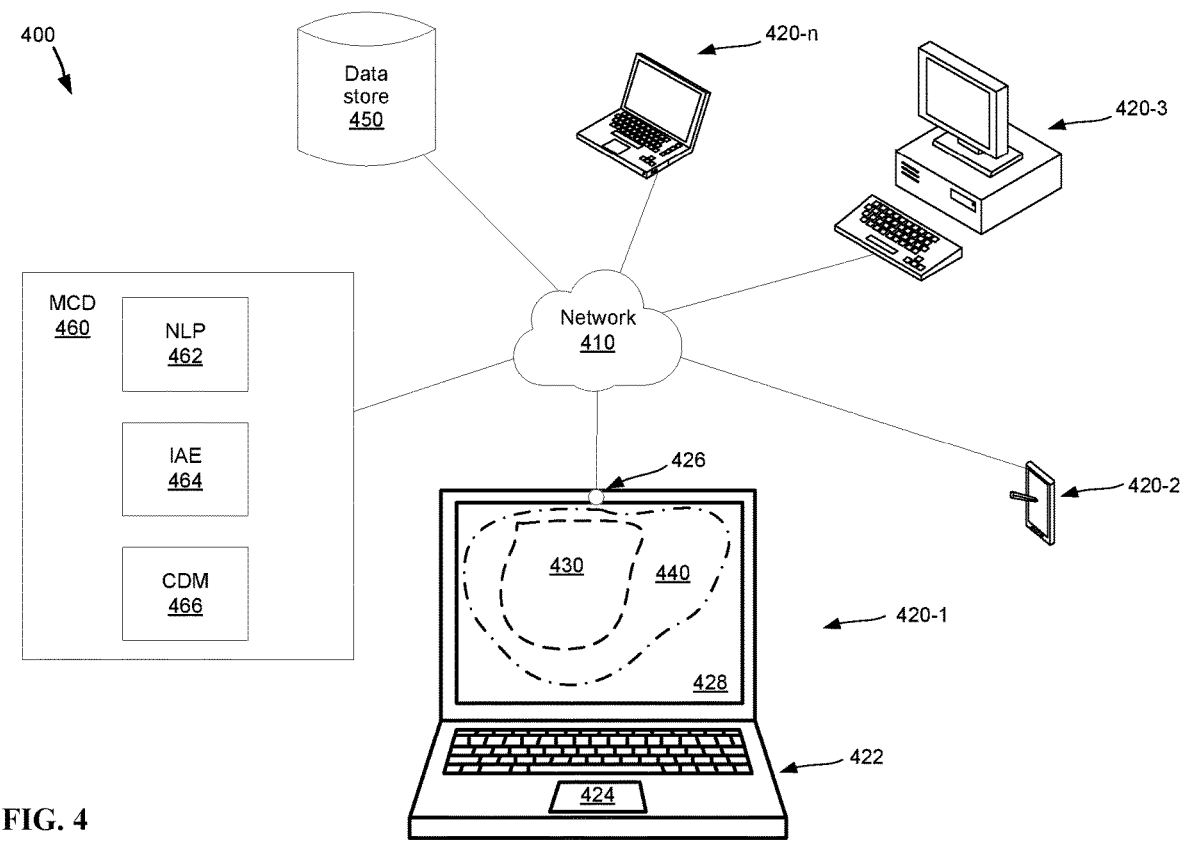
FIG. 4 depicts an example system for performing communication session modifications, consistent with some embodiments of the disclosure.

FIG. 4 depicts an example system 400 for performing communication session modifications, consistent with some embodiments of the disclosure. System 400 may include the following: a network 410 for communicatively coupling various components; a plurality of computing devices 420-1, 420-2, 420-3, up to 420-n (collectively, computing devices 420) (alternatively, computers or client devices); a datastore 450 for storing one or more records; and an MCD 460 configured to modify communication sessions for the computing devices 420.

Network 410 may be a communications network for facilitating the sharing of messages (e.g., share actions) between the computing devices 420. Network 410 can be implemented using any number of any suitable physical and/or logical communications topologies. The network 410 can include one or more private or public computing networks. For example, network 410 may comprise a private network (e.g., a network with a firewall that blocks non-authorized external access) that is associated with a particular function or workload (e.g., communication, streaming, hosting, sharing), or set of software or hardware clients. Alternatively, or additionally, network 410 may comprise a public network, such as the Internet. Consequently, network 410 may form part of a data unit network (e.g., packet-based)—for instance, a local-area network, a wide-area network, and/or a global network.

Network 410 can include one or more servers, networks, or databases, and can use one or more communication protocols to transfer data between other components of system 400. Furthermore, although illustrated in FIG. 4 as a single entity, in other examples network 410 may comprise a plurality of networks, such as a combination of public and/or private networks. The communications network 410 can include a variety of types of physical communication channels or "links." The links can be wired, wireless, optical, and/or any other suitable media. In addition, the communications network 410 can include a variety of network hardware and software (not depicted) for performing routing, switching, and other functions, such as routers, switches, base stations, bridges, or any other equipment that may be useful to facilitate communicating data.

The plurality of computing devices 420 may be computer systems that include the necessary components to facilitate communication sessions. Specifically, the computing devices 420 may be client devices that include necessary processing, memory, and network capability to send and receive messages. For example, example computer 100, shown in FIG. 1, may be capable of performing as a computing device 420. Each of the computing devices may be capable of receiving input from and display output to a user (not depicted) to facilitate interaction and communication. For example, computer 420-2 may be a tablet or smartphone that is capable of receiving touch gestures, pen input, voice commands and the like.

Computer 420-1 may be a laptop computer that includes various input and output devices and that represents the capabilities of the various computing devices 420. Specifically, computer device 420-1 may include the following components: a keyboard 422 for typing, a trackpad 424 for cursor movement, a camera 426 for capturing images, and a display 428 for providing a user interface.

The datastore 450 may be a physical or logical data storage entity configured to store records related to the computing devices 420 and various communication sessions. The datastore 450 may be a single physical server for storing all records of system 400. In some embodiments, the datastore 450 may be a plurality of physical or logical store entities. For example, datastore 450 may exist on each computing device 420 and may include or have a particular instance of database, flat file, or other relevant structure for storing data.

The datastore 450 may be a user profile datastore for storing data related to users (not depicted). Specifically, the datastore 450 may contain records or profiles of users that use the computing devices 420. The datastore 450 may include preferences or profiles that relate to how a user prefers to operate various programs including messaging applications. For example, each participant of a messaging app may have a profile in the datastore 450 that indicates that type of documents that are important to the participant, word associations that a participant has to particular types of content, viewing preferences, and other relevant preference information.

The datastore 450 may be a messaging datastore for storing data related to communication sessions. For example, the datastore 450 may be run or administered by an application service provider (not depicted) that hosts or provides messaging application access to the computing devices 420 through the network 410. The datastore 450 may include various documents, such as historical records of previous share actions and messages (e.g., chat history) for each communication session that is a part of the messaging application. The computing devices 420 may, upon connecting to the messaging application, retrieve and display communication sessions based on the previous messages that are stored in the datastore 450.

The MCD 460 may be a collection of software and/or hardware that is configured to perform highlighting and/or surfacing of content, such as multimedia documents (alternatively, media documents). Specifically, the MCD 460 may operate as part of a computer system, such as computer 100. The MCD 460 may operate on one or more of the computing devices 420. For example, an instance of MCD 460 may operate on computing device 420-1 and a second instance of MCD 460 may operate on computing device 420-2. The MCD 460 may operate on a plurality of computing devices, such as a part of abstracted computing environment 50, shown in FIG. 2. The MCD 460 may be configured to store information or results of performing highlighting and surfacing, such as by storing it locally or storing it in the datastore 450. The MCD 460 may be configured to identify share actions that include media documents in various communications session. The MCD 460 may also be configured to analyze the reaction data that is related to the share actions. Further, the MCD 460 may be configured to modify a communication session based on the determination of the relevant media documents.

The MCD 460 may leverage one or more daemons, jobs, processes, or threads to monitor the communication sessions of the computing devices 420 for media documents. The media documents may be images, pictures, videos, presentation slides, screenshots, graphics, animated or other visual files. The monitoring may be performed directly by the MCD 460. For example, the MCD 460 may view a messaging queue located locally in a memory (not depicted) of computing device 420-2. In another example, the MCD 460 may intercept input from keyboard 422, trackpad 424, and/or the camera 426 of computing device 420-1. The monitoring may be performed indirectly by the MCD 460. For example, messages and other share actions may be transported through network 410 to an intermediary, such as an application service provider (not depicted), that hosts the messages. The MCD 460 may analyze reaction data that is not a part of the communication session.

Upon identification of a media document that is part of a share action, the MCD 460 may analyze the reaction data to the share action and the media documents. For instance, the MCD 460 may analyze the reaction data to media documents in a given communication session. The reaction data may include textual messages, textual messages that are provided just before or just after the share action that includes the media documents, textual messages that are direct replies to the share actions, and other textual information. The reaction data may include non-verbal reaction data, such as likes, stars, hearts, thumbs, emojis, animated Graphics Interchange Formats, or other videos and graphical representations.

The reaction data may be provided by users (not depicted) of the computing devices 420. For example, a participant in a communication session may use computer 420-1 to type responses via keyboard 422, move a cursor around over the communication session with the trackpad 424, or view the screen 428. The camera 426 may capture eye movement of the participant as they view the communication session on the screen 428. The eye movement may indicate a primary gaze 430 and a secondary gaze 440 of the communication session. Information that a participant types, movement and selection of items with a cursor, and the primary gaze 430 and secondary gaze 440 may all be consider reaction data to be analyzed by the MCD 460.

The MCD 460 may perform analysis on the reaction data that is temporally related, such as posts, responses, and behavior that are provided in response to the share action within a predetermined response time. The predetermined response time may be based on a relevant amount of time that a user typically responses to messages, such as five minutes, thirty minutes, forty-five seconds, under one hour. The reaction data may include additional messages that are not related to the share actions that include media documents. For example, the MCD 460 may identify additional messages that are not directly following the share action, such as messages that follow additional unrelated messages or messages that are not temporally related to the reaction data. In another example, at a first time, a user may share a media document in a communication session that is accessed by the computing devices 420. The MCD 460 may continue to monitor the communication session (e.g., hours later, the following week) and may continue to perform analysis on additional messages. The analysis may include processing the natural language content of the reaction data and the natural language content of the additional messages. The MCD 460 may identify an association or relationship between the additional messages and the reaction data (e.g., similar or the same keywords in textual messages, similar or the same non-textual messages). In response to identifying the association or relation between the reaction data and the additional messages, the MCD 460 may treat the additional messages as a part of the reaction data.

The MCD 460 may utilize one or more of the various components to analyze the reaction data that are related to the share actions and to determine relevant messages from the reaction data. Specifically, the MCD 460 may include the following: a natural language processor ("NLP") 462, and an image analysis engine ("IAE") 464. In some embodiments, the MCD 460 may perform the analysis without analyzing the share action. Specifically, a share action that includes a media document may be shared with a universally unique identifier, file name, or other relevant reference. The analysis by the MCD 460 may be based solely on the reaction data and stored as a record that is associated with the relevant reference to the media document only by the relevant reference. In some embodiments, the MCD 460 may perform the analysis by also analyzing the share action. Specifically, the MCD 460 may scan, read, view, or otherwise analyze the share action and the reaction data.

The MCD 460 may utilize the NLP 462 to analyze information from the textual messages that are a part of the reaction data. The NLP 462 may include various components (not depicted) operating through hardware, software, or in some combination. For example, a microprocessor, one or more data sources, a search application, and a report analyzer. The NLP 462 may be a computer module that analyses the received content and other information. The NLP 462 may perform various methods and techniques for analyzing textual information (e.g., syntactic analysis, semantic analysis, etc.). The NLP 462 may be configured to recognize and analyze any number of natural languages. In some embodiments, the NLP 462 may parse passages of documents or content from textual messages that are shared in communication sessions between the computing devices 420. Various components (not depicted) of the NLP 462 may include, but are not limited to, a tokenizer, a part-of-speech (POS) tagger, a semantic relationship identifier, and a syntactic relationship identifier. The NLP 462 may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., chat history stored in datastore 450, profile data stored in datastore 450, language and phrases from additional or other communication sessions). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the NLP 462.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the NLP 462 may be a computer module that may parse a document and generate corresponding data structures for one or more portions of the document. For example, in response to receiving a plurality of textual messages from multiple computing devices 420, the NLP 462 may output parsed text elements from the data. In some embodiments, a parsed text element may be represented in the form of a parse tree or other graph structure, and the leaf nodes and/or branches may be associated with or correspond to the particular computing devices 420. To generate the parsed text element, the NLP 462 may trigger computer modules including the tokenizer, the part-of-speech (POS) tagger, the SVM generator, the semantic relationship identifier, and the syntactic relationship identifier.

In another example, the MCD 460 may leverage the image analysis engine 464 to scan the visual output of the communication session, to analyze the share action and the reaction data. The IAE 464 may be a collection of hardware and software, such as an application specific integrated circuit. The IAE 464 may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the IAE 464 may be configured to aid in identifying content of share actions and reaction data (e.g., by analyzing images that are shared in previous communication sessions that are stored in the datastore 450).

In some embodiments, objects may be identified by the IAE 464 using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a series of photos that include text and non-text data may be analyzed. Using a relevant object detection algorithm, the textual elements may be identified.

In some embodiments, features of the objects may be determined by the IAE 464 using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a tree, a human face, a dog, etc.) can be output as classifications determined by the supervised machine learning model.

Characteristics analyzed by the IAE 464 may include the shapes of objects, dimensions (e.g., height, length, and width) of objects, a number of objects (e.g., three columns of a chart), colors of object, and/or other attributes of objects. In some embodiments, the IAE 464 may generate a list including the identity and/or characteristics of objects (e.g., two humans, three financial datapoints, etc.). In some embodiments, the IAE 464 may output an indication that an identity or characteristic of an object is unknown. The indication may include a request for additional input data that can be analyzed such that the identity and/or characteristics of objects may be ascertained. In some embodiments, various objects, object attributes, and relationships between objects (e.g., hierarchical and direct relations) may be represented by the IAE 464 within a knowledge graph (KG) structure. Objects may be matched to other objects based on shared characteristics (e.g., two media documents may be differing point-of-view images of the same subject), relationships with other objects (e.g., a first element on a first slide of a presentation may be a primary element that broadly describes two other elements on a second slide of the presentation), or objects belonging to the same class (e.g., three numbers in a financial image may be peers that describe a change in a status of a measured financial metric over time).

The MCD 460 may also be configured to determine relevant media documents from the analysis. Specifically, the MCD 460 may also include a content differentiation model ("CDM") 466 that is configured to determine from the various media documents, one or more relevant media documents in a given communication session. The relevant media documents may then be highlighted or surfaced by the MCD 460. The CDM 466 may be a model that is preconfigured to determine a highlighting coefficient that is used to score various media documents. The highlighting coefficient is scored based on one or more features from the communication sessions. For example, the CDM 466 may score media documents based on at least the following: a gaze of a participant, the length of time of the gaze, the horizontal and vertical coordinates that correspond to a display of a computing device, the logarithmic likelihood of various words, a collocation of a term, a collocation of a position, a corpus of linguistics that related to textual messages, and reaction data. The CDM 466 may be configured to generate a scored array that contains a series of normalized coefficients. For example, the normalized coefficients may each have a value that is between '0' and '1' that may be used to determine an interest or relevance of a media document, such as coefficients that are near to '1' being more relevant.

The CDM 466 may use one or more techniques for scoring. For example, the CDM 466 may leverage corpus linguistic techniques such as mutual information, and the Z-score may be used to compute scores for term collocation and collocation position, as a measure that certain words occur together because they belong together in some way rather than appearing together by chance. The Z-score (aka standard score) indicates how far a data point is from the mean. Measuring collocation with mutual information shows the level of dependency between two terms. Mutual information can be used to select the highest scoring collocation pairs and discard those that are less relevant. These scores can identify multiword expressions such as 'long-term memory' and 'spill the beans'. Collocation analysis also plays a role in disambiguating word senses, for example the word 'bass' might occur together in a text with 'music' and 'jazz', indicating the instrument sense of the word, while collocation with 'bait' and 'tackle' indicates the fish sense of the word. These techniques are used to analyze the text associated with multimedia content, including user comments.

The CDM 466 may use relevant eye-tracking metrics such as length of time of eye fixation (how long someone spends looking at something) and gaze points (where they are looking) as indicators of visual attention reaction data from the user. Longer looking durations can be interpreted as increased interest in a specific image or screen region. For example, based on receiving gaze data from a primary gaze 430 that indicates a user of computing device 420-1 was more than twelve seconds, while secondary gaze 440 was seven seconds, the CDM 466 may determine messages and other reaction data that is relevant.

Image recognition technology, leveraged from the IAE 464, may be configured to identify places, people, and other objects in media documents with some measurable level of confidence. Identified objects can then be associated with text related to the image, which would amplify the individual scores of the image and the text alone.

Scoring techniques of the CDM 466 may include scoring techniques other than visual- and textual-based; such as tabulating actions on the multimedia content such as saving, downloading, forwarding, or sharing of media documents. For example, some users may consistently save content that they are interested in, so this action would be a strong indicator of user interest and could be weighted more heavily to reflect this.

The CDM 466 may score based on significance scores from tests such as log-likelihood to measure the significance of the model results. If the log-likelihood score is significant, then the results are meaningful. If the log-likelihood is not significant, then the results are no better than random and further analysis and/or data collection may be required before the CDM 466 can make a confident prediction.

The CDM 466 may be a model that is preconfigured to generate a structure for each user of system 400 (e.g., each user that is communicating through communication sessions hosted by the computing devices 420). The structure may be a relevant computer structure, such as a Java Script Object Notation ("JSON") file. The CDM 466 scores as a series of normalized coefficients between 0 and 1 that are used to determine a user's interest. Individual scores can be down or up-weighted to reflect relative value based on historical data. The CDM 466 may aggregate the scores to arrive at a single optimal prediction for highlighting relevant content.

FIGS. 5A, 5B, 5C, and 5D (collectively, FIG. 5) depict a plurality of screen/display views of a messaging application 500, consistent with some embodiments of the disclosure. The messaging application 500 may be created by a CDM, such as CDM 460 of system 400. Specifically, the messaging application 500 may be rendered in FIG. 5 as a series of depictions 510-1, 510-2, 510-3, and 510-4 (collectively, depictions 510) from the view of multiple computing devices, such as the computing devices 420. Each of the computing devices may have a view of the messaging application 500 from a depiction 510 that represents the view as seen by a user (not depicted). Consistent with some embodiments, the depictions 510 may be generated based on media documents and reaction data from communication sessions.

Figure 5A:
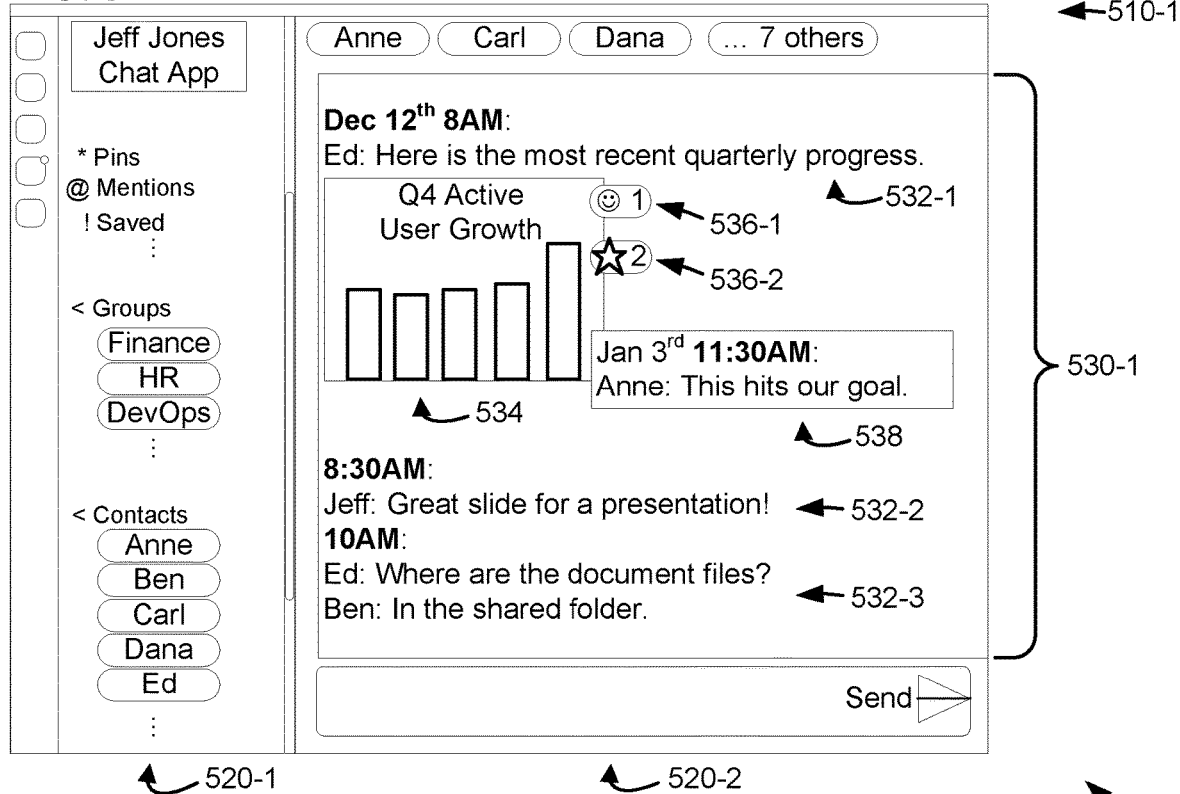
FIG. 5A depicts a first depiction of a messaging application, consistent with some embodiments of the disclosure.

FIG. 5A depicts a first depiction 510-1 of a messaging application 500, consistent with some embodiments of the disclosure. The depiction 510-1 may include a contacts section 520-1 and a communication section 520-2. As indicated in the contacts section 520-1, depiction 510-1 may be an instance of the messaging application 500 for a user (e.g., user "Jeff Jones"). The communication section 520-2 may represent a communication session between a plurality of users (e.g., ten users including Jeff Jones and other participants).

In the communication session, there may be one or more share actions 530-1. Specifically, share actions 530-1 may include the following: textual messages 532-1, 532-2, 532-3 (collectively, textual messages 532); at least one multimedia message 534; emotive messages 536-1 and 536-2; and replies 538. The share actions 530-1 may be monitored and multimedia documents that are included with share actions 530-1 may be identified and analyzed by an MCD, such as by MCD 460. For example, an MCD may identify textual message 532-1 and multimedia message 534 as including media documents. The MCD may also analyze the reaction data of the communication session. For example, the MCD may analyze the textual messages 532, the emotive messages 536, and the replies 538. Though not depicted, the MCD may also analyze any additional multimedia messages 534 as part of analyzing the reaction data. The MCD may also determine that one or more of the share actions 530-1 should not be considered reaction data. For example, the MCD may determine based on a time component, that textual messages 532-3 are not reaction data to multimedia message 534.

Figure 5B:
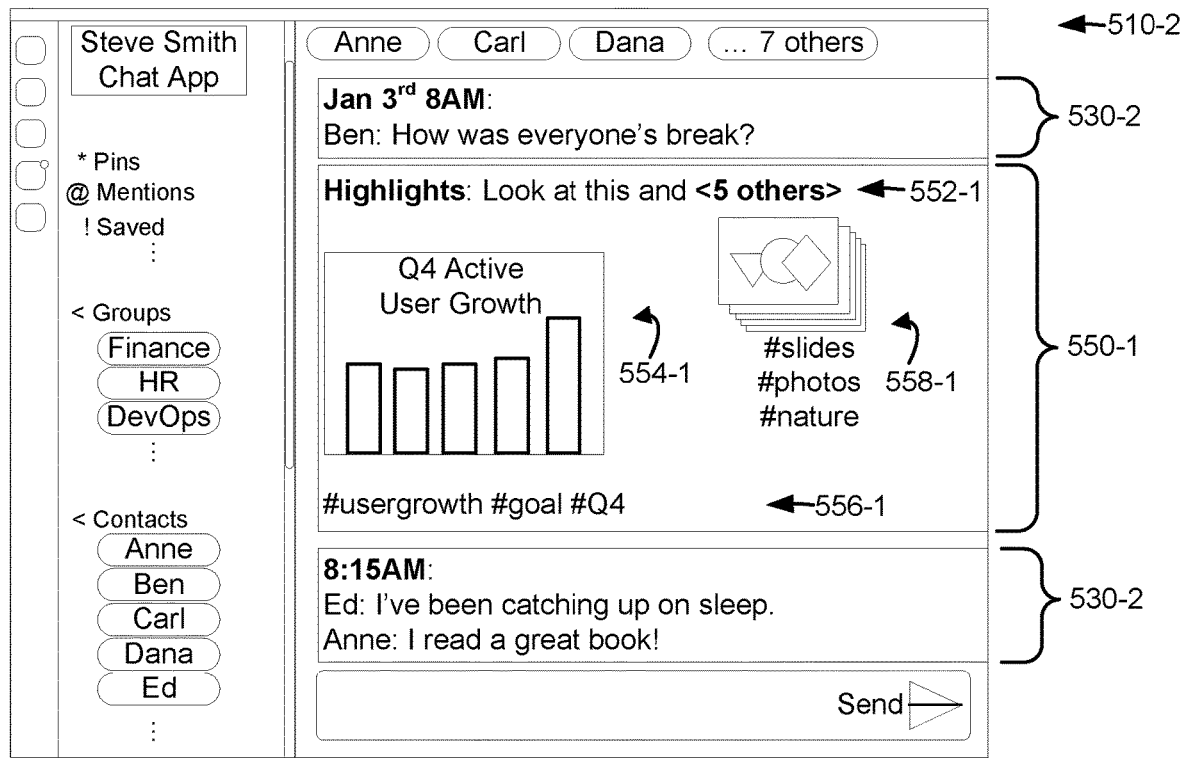
FIG. 5B depicts a second depiction of the messaging application, consistent with some embodiments of the disclosure.

FIG. 5B depicts a second depiction 510-2 of the messaging application 500, consistent with some embodiments of the disclosure. The depiction 510-2 may include similar sections as those in depiction 510-1, though not labeled in FIG. 5B (e.g., a contacts section and a communication section). As indicated, depiction 510-2 may be an instance of the messaging application 500 for a user (e.g., user "Steve Smith"). The communication session may be the same ten-person communication session as in depiction 520-1.

The communication session may be at a later time or date than as depicted in FIG. 5A. For example, depiction 510-1 may be near the end of calendar year, and depiction 510-2 may be at the beginning of the following year. Depiction 510-2 may be a modified or updated instance of the messaging application 500. Specifically, MCD may modify the communications session by updating the depiction 510-2 to include relevant media documents from the communication session. The MCD may generate a media document graphic 550-1 to update the depiction 510-2. The MCD may generate the depiction 510-2 by inserting the media document graphic 550-1 inline in between the share actions 530-2. The media document graphic 550-1 may be displayed in the depiction 510-2, by the MCD, based on a relevant time. For example, the media document graphic 550-1 may be displayed near the beginning of the work-day and/or after a return from an extended break, such as a weekend or holiday.

The media document graphic 550-1 may include one or more elements. For example, media document graphic 550-1 may include one or more of the following: a header 552-1; a relevant media document 554-1; one or more relevant tags 556-1; and one or more additional relevant media 558-1. The header 552-1 may describe the media document graphic 550-1. The header 552-1 may also describe the additional relevant media 558-1. The one or more relevant tags 556-1 may describe the relevant media document 554-1. The additional relevant media 558-1 may include additional images and videos that are determined to be relevant. The additional relevant media 558-1 may also be accompanied by tags that are similar to or different than the one or more relevant tags 556-1.

The elements of the media graphic 550-1 may be displayed in the depiction 510-2, by the MCD, based on one or more factors. The factors may include the chat history of the communication session. For example, the relevant tags 556-1 may be based on the share actions 530-1 (shown in FIG. 5A). The factors may include the number of reactions (e.g., reaction data). For example, share action 534 may have led to or influenced reaction data that includes five additional share actions. The factors may include scoring of media documents, such as from a determination by the MCD of relevance or importance of media documents. The scoring may be based on an individual. For example, the generation of the media graphic 550-1 may be based on user "Steve Smith", such as based on a Steve Smith's profile or chat history. The scoring may be based on other users besides "Steve Smith", such as other participants that are a part of the communication session.

Figure 5C:
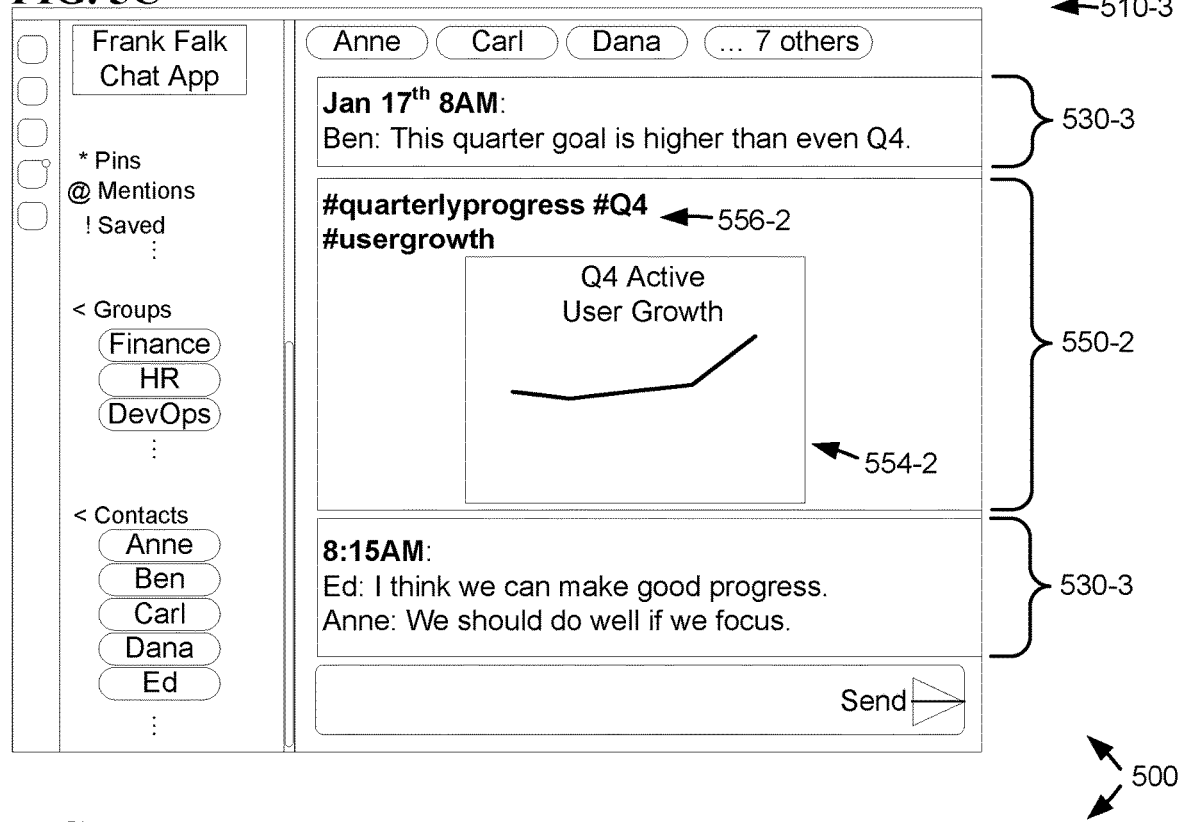
FIG. 5C depicts a third depiction of the messaging application, consistent with some embodiments of the disclosure.

FIG. 5C depicts a third depiction 510-3 of the messaging application 500, consistent with some embodiments of the disclosure. The depiction 510-3 may include similar sections as those in depiction 510-1, though not labeled in FIG. 5C (e.g., a contacts section and a communication section). As indicated, depiction 510-3 may be an instance of the messaging application 500 for a user (e.g., user "Frank Falk"). The communication session may be the same ten-person communication session as in depiction 520-1.

The communication session may be at a later time or date than as depicted in FIG. 5A. For example, depiction 510-3 may be approximately a month after the time period of depiction 510-1. Depiction 510-3 may be a modified or updated instance of the messaging application 500. Specifically, MCD may modify the communications session by updating the depiction 510-3 to include relevant media documents from the communication session. The MCD may generate a media document graphic 550-2 to update the depiction 510-3. The MCD may generate the depiction 510-3 by inserting the media document graphic 550-2 inline in between the share actions 530-3. The media document graphic 550-2 may be displayed in the depiction 510-3, by the MCD, based on a relevant conversation. For example, the media document graphic 550-2 may be displayed responsive to messages that are shared in the communication session in share actions 530-3.

The media document graphic 550-2 may include one or more elements. The media document graphic 550-2 may be different than the media graphic document 550-1. For example, media document graphic 550-2 may include one or more of the following: a relevant media document 554-2; and one or more relevant tags 556-2. The one or more relevant tags 556-2 may describe the relevant media document 554-2.

The media document graphic 550-2 may include content altered by the MCD to have a differing appearance. For example, the MCD may alter the media document 534 (shown in FIG. 5A) (e.g., a bar chart) to generate relevant media document 554-2 (e.g., a line graph) for a viewing preference of Frank Falk. The MCD may alter or change content based on one or more user preferences. Based on preferences, the MCD may convert to the format most commonly used for a given user profile (e.g., a type of document that is commonly viewed or uploaded or shared or downloaded by a given user). Other conversion of media documents may be contemplated by the MCD. For example, if a participant in a communication session usually ends up reading the transcript instead of viewing a video, then the MCD may highlight whether a transcript exists or if one does, highlight the transcript as opposed to the video.

The tags 556-2 of the media document graphic 550-2 may be based on profile or user data, such as profile data for Frank Falk. The tags 556-2 may be based on other users, such as users that are providing the share actions 530-3.

Figure 5D:
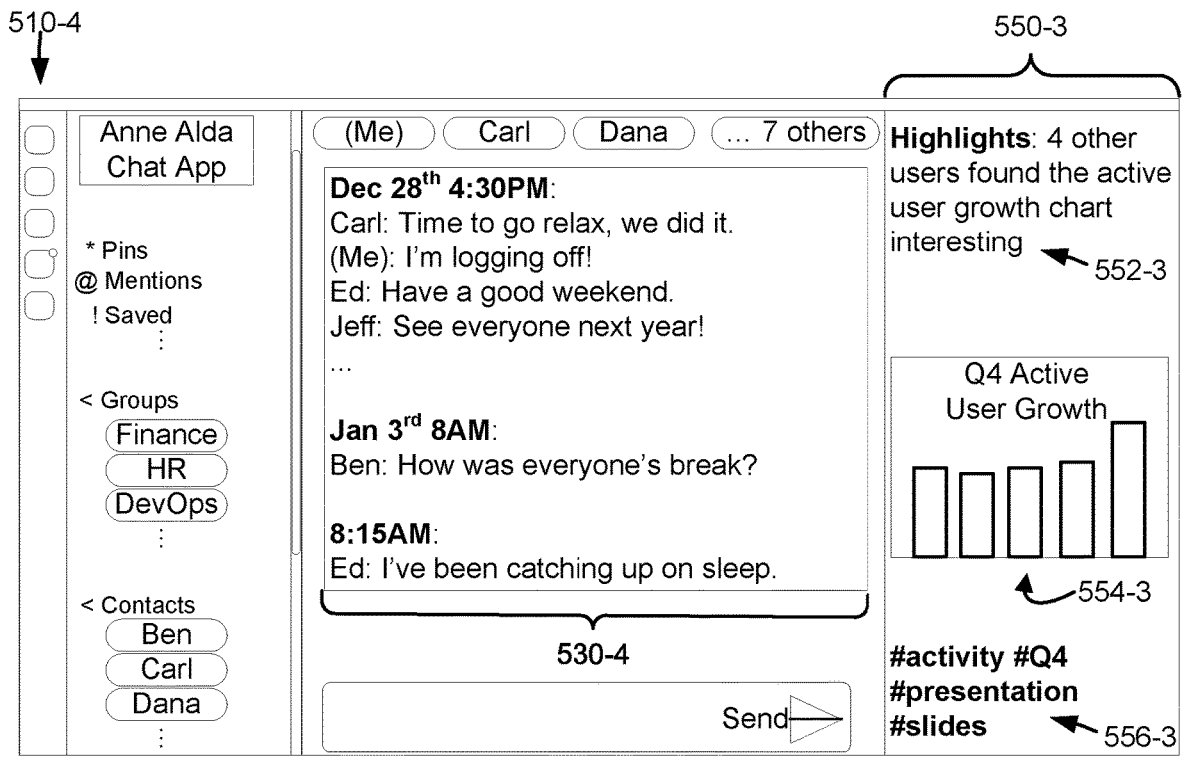
FIG. 5D depicts a fourth depiction of the messaging application, consistent with some embodiments of the disclosure.

FIG. 5D depicts a fourth depiction 510-4 of the messaging application 500, consistent with some embodiments of the disclosure. The depiction 510-4 may include similar sections as those in depiction 510-1, though not labeled in FIG. 5D (e.g., a contacts section and a communication section). As indicated, depiction 510-4 may be an instance of the messaging application 500 for a user (e.g., user "Anne Alda"). The communication session may be the same ten-person communication session as in depiction 520-1.

The communication session may be at a later time or date than as depicted in FIG. 5A. For example, depiction 510-4 may be approximately two weeks after the time period of depiction 510-1. Depiction 510-4 may be a modified or updated instance of the messaging application 500. Specifically, MCD may modify the communications session by updating the depiction 510-4 to include relevant media documents from the communication session. The MCD may generate a media document graphic 550-3 to update the depiction 510-4.

The MCD may generate the depiction 510-4 that includes the media document graphic 550-3 without interrupting the communication session. Specifically, the MCD may not interrupt the share actions 530-4 of the depiction 510-4 (e.g., the share actions 530-4 may be unbroken or continuous in nature. The media document graphic 550-3 may be rendered in the depiction 510-4 as a slide-out or separate rendered graphic (e.g., a panel, a sidebar, a floating toolbar) that exists beside the share actions 530-4.

The MCD may generate the depiction 510-4 that includes the media document graphic 550-3 without regard to the current time or status of the communication session. For example, the media document graphic 550-3 may exist as a separate rendered graphic without regard for or without respond to the current conversation. The MCD may generate the depiction 510-4 by constantly updating the media graphic document 550-3, as conversations happen; e.g., as share actions with additional media documents are added, as additional reaction data is analyzed.

The media document graphic 550-3 may include one or more elements. The media document graphic 550-3 may be different than the media graphic document 550-1 or media graphic document 550-2. For example, media document graphic 550-3 may include one or more of the following: a header 552-3, a relevant media document 554-3; and one or more relevant tags 556-3. The one or more relevant tags 556-3 may describe the relevant media document 554-3. The header 552-3 may editorialize or express information about the interest or relevant of the communication session, such as indicating the number of interested participants. The tags 556-3 may also be interactive. For example, the tags 556-3 may allow for categorization that is responsive to a mouse click or touch gesture with the tags. The tags 556-3 may facilitate user exploration, e.g., in response to clicking or gesturing on a given tag, various other related media documents may be provided.

Figure 6:
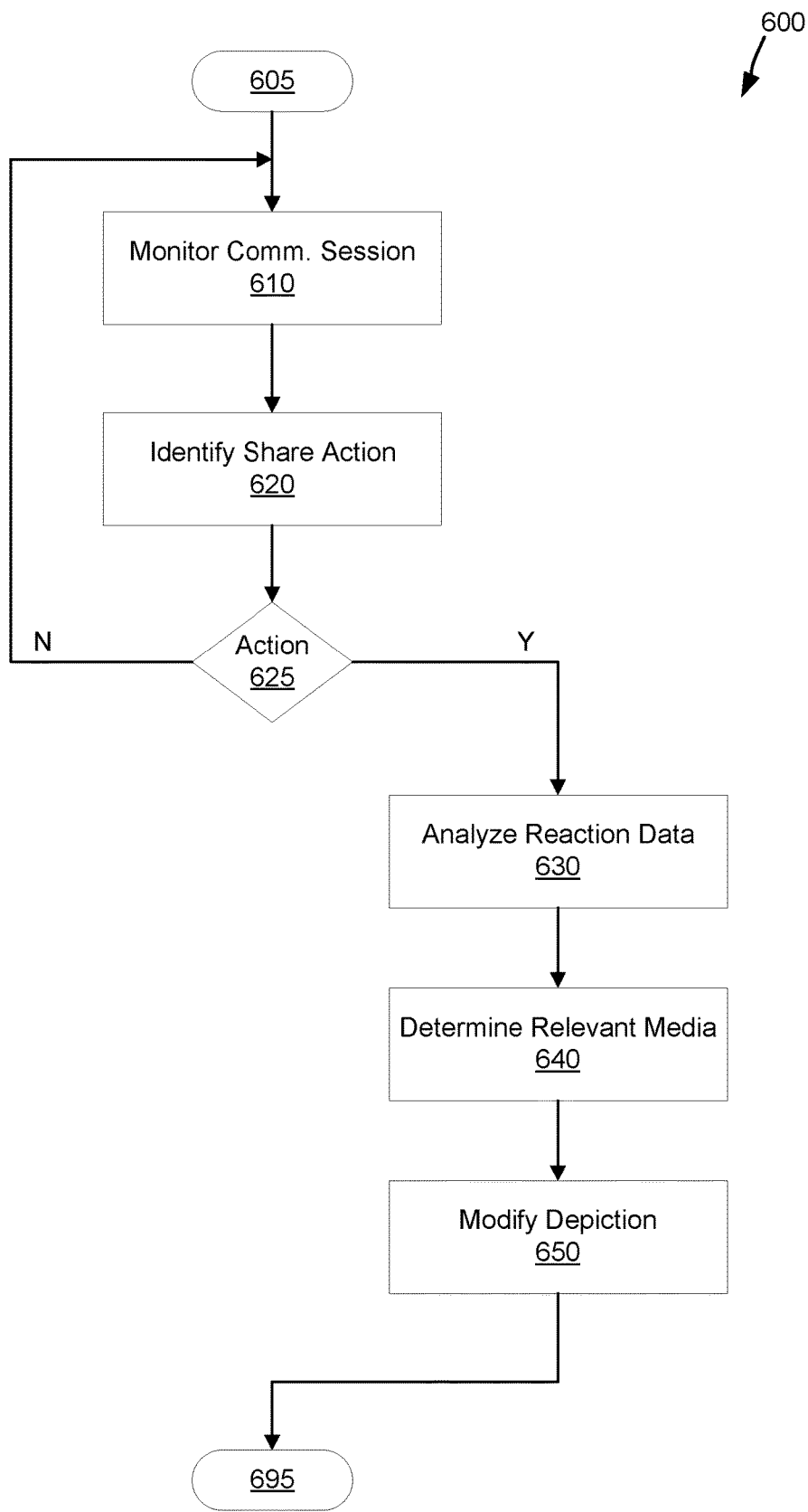
FIG. 6 depicts a method of modifying messaging applications, consistent with some embodiments of the disclosure.

FIG. 6 depicts a method 600 of modifying messaging applications, consistent with some embodiments of the disclosure. Specifically, method 600 may be performed by an MCD, such as MCD 460, to modify or update a depiction of a communication session that is part of a messaging application. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

From start 605, a communication session may be monitored at 610. The communication session may include two or more computing devices. For example, the communication session may be a group chat between seven individuals. Continuing the example, each of the seven individuals may access the communication session from a separate computing device. The monitoring may be performed continuously. For example, the monitoring at 610 may be spawned on a first thread of a process or a computer system. Other operations of method 600 may then be spawned or operated on additional threads, and method 600 may continue to monitor in parallel.

At 620, a share action may be identified from the communication session. The share action may be identified based on the monitoring. The share action may be identified based on the share action including one or more media documents. For example, a message that includes a graphic, picture, image, slide, or other relevant visual depiction.

If a share action is not identified at 625:N, then method 600 continues to monitor the communication session at 610. If a share action is identified at 625:Y, reaction data may be analyzed at 630. The reaction data may be analyzed based on its relation to the share action that includes the media documents. For example, if an image is identified, then any reaction data including replies, temporally relevant messages, non-textual reactions, emoji, and other relevant reaction data may be analyzed.

One or more relevant media documents may be determined at 640. The relevant media documents may be determined based on the analysis of the reaction data. For example, based on scoring the various media documents that are shared in a communication session, a coefficient may be calculated. The coefficient may indicate the likelihood of relevant or importance of a given media document. The coefficient may be based on a user, such as a single participant in a multi-party chat. The coefficient may be based on a group, such as preferences and history of all of the participants indicate a common or popular media document to all of the participants.

A depiction of the communication session may be modified at 650. The modification may be to highlight, surface, or otherwise call attention to the relevant media documents, determined at 640. The depiction may be a depiction of the communication session from a computing device.

After the depiction is modified, at 650, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   monitoring a communication session between two or more computing devices;
   identifying, based on the monitoring the communication session, one or more share actions in the communication session,
   wherein the one or more share actions include one or more media documents shared in the communication session,
   wherein the identifying the one or more share actions is responsive to the one or more media documents;
   analyzing, in response the one or more share actions and based on the media documents, reaction data in the communication session, the reaction data is related to the one or more share actions;
   determining, based on the analyzing the reaction data and based on the one or more media documents, one or more relevant media documents; and
   modifying, based on the one or more relevant media documents, a first depiction of the communication session,
   wherein the first depiction is rendered by a first computing device of the two or more computing devices.

2. The method of claim 1, wherein:
   at least one share action of the one or more share actions includes one or more textual messages, and
   the analyzing is further based on the one or more textual messages.

3. The method of claim 1, wherein the reaction data includes one or more textual messages in the communication session.

4. The method of claim 3, wherein the one or more textual messages are temporally related to the one or more share actions that include media documents.

5. The method of claim 3, wherein the one or more textual messages are responses to the one or more share actions that include media documents.

6. The method of claim 3, wherein the method further comprises:
   detecting, based on the communication session, a second textual message;
   identifying an association between the second textual message and the one or more textual messages; and
   adding, in response to the association, the second textual message to the reaction data.

7. The method of claim 6, wherein the second textual message is not temporally related to the one or more textual messages.

8. The method of claim 1, wherein the reaction data includes one or more non-textual actions in the communication session.

9. The method of claim 8, wherein the method further comprises:
   monitoring the communication session after a first share action of the one or more share actions that includes a first media document;
   detecting, based on the monitoring the communication session after the first share action, a second share action of the one or more share actions that includes the first media document; and adding, in response to the detecting, the second share action to the reaction data.

10. The method of claim 8, wherein the method further comprises:
    monitoring the communication session after a first share action of the one or more share actions that includes a first media document;

detecting, based on the monitoring the communication session after the first share action, a save action that includes the first media document; and adding, in response to the detecting, the save action to the reaction data.

11. The method of claim 1, wherein the determining one or more relevant media documents is based on a messaging history.

12. The method of claim 11, wherein the messaging history includes previous messages sent to the communication session by the first computing device.

13. The method of claim 11, wherein the messaging history includes previous messages sent to the communication session by a second computing device of the two or more computing devices.

14. The method of claim 1, wherein:
the first computing device is related to a first user profile of a first user of the first computing device, and
the determining is based on the first user profile.

15. The method of claim 1, wherein:
a second computing device of the two or more computing devices is related to a second user profile of a second user,
the determining includes determining, based on the second user profile and based on the reaction data, one or more second relevant media documents from the one or more media documents in the communication session, and
the method further comprises:
modifying, based on the one or more relevant media documents, a second depiction of the communication session,
wherein the second depiction is rendered by the second computing device of the two or more computing devices.

16. The method of claim 1, wherein the modifying the first depiction further comprises:
generating, in response to the determining the one or more relevant media documents, one or more textual tags that relate to the one or more relevant media documents; and
creating a list in the first depiction that includes the one or more textual tags,
wherein the list is responsive to input from the first computing device.

17. The method of claim 16, wherein the list includes one or more descriptive messages that describe the reaction data that is related to the one or more relevant media documents.

18. The method of claim 1, wherein the modifying the first depiction further comprises:
generating, in response to the determining the one or more relevant media documents, the first depiction to include at least a first relevant media document of the one or more relevant media documents.

19. A system, the system comprising:
a memory, the memory containing one or more instructions; and
a processor, the processor communicatively coupled to the memory, the processor, in response to reading the one or more instructions, configured to:
monitor a communication session between two or more computing devices;
identify, based on the monitoring the communication session, one or more share actions in the communication session,
wherein the one or more share actions include one or more media documents shared in the communication session,
wherein the identifying the one or more share actions is responsive to the one or more media documents;
analyze, in response the one or more share actions and based on the media documents, reaction data in the communication session, the reaction data is related to the one or more share actions;
determine, based on the analyzing the reaction data and based on the one or more media documents, one or more relevant media documents; and
modify, based on the one or more relevant media documents, a first depiction of the communication session,
wherein the first depiction is rendered by a first computing device of the two or more computing devices.

20. A computer program product, the computer program product comprising:
one or more computer readable storage medium; and
program instructions collectively stored on the one or more computer readable storage media, the program instructions configured to:
monitor a communication session between two or more computing devices; identify, based on the monitoring the communication session, one or more share actions in the communication session,
wherein the one or more share actions include one or more media documents shared in the communication session,
wherein the identifying the one or more share actions is responsive to the one or more media documents;
analyze, in response the one or more share actions and based on the media documents, reaction data in the communication session, the reaction data is related to the one or more share actions;
determine, based on the analyzing the reaction data and based on the one or more media documents, one or more relevant media documents; and
modify, based on the one or more relevant media documents, a first depiction of the communication session,
wherein the first depiction is rendered by a first computing device of the two or more computing devices.

* * * * *